(12) United States Patent
Ober

(10) Patent No.: US 8,006,110 B2
(45) Date of Patent: Aug. 23, 2011

(54) METHOD AND APPARATUS FOR KEEPING A VIRTUAL PRIVATE NETWORK SESSION ACTIVE ON A PORTABLE COMPUTER SYSTEM INCLUDING WIRELESS FUNCTIONALITY

(75) Inventor: Robert Ober, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1454 days.

(21) Appl. No.: 11/478,738

(22) Filed: Jun. 30, 2006

(65) Prior Publication Data

US 2008/0004011 A1 Jan. 3, 2008

(51) Int. Cl.
*G06F 1/00* (2006.01)
*G06F 1/32* (2006.01)

(52) U.S. Cl. ........ 713/324; 713/310; 713/320; 713/323; 455/127.1; 455/522; 370/338

(58) Field of Classification Search .................. 370/338, 370/328, 395.53; 455/127.1, 522; 713/310, 713/320, 323, 324
See application file for complete search history.

(56) References Cited

U.S. PATENT DOCUMENTS

| 7,295,534 | B2* | 11/2007 | Park et al. ................ | 370/328 |
|---|---|---|---|---|
| 7,389,534 | B1* | 6/2008 | He ............................. | 726/15 |
| 7,565,529 | B2* | 7/2009 | Beck et al. ................ | 713/156 |
| 7,800,534 | B1* | 9/2010 | Yenney et al. ............ | 342/357.59 |
| 2003/0114152 | A1* | 6/2003 | Gibbs et al. .............. | 455/419 |
| 2003/0182431 | A1* | 9/2003 | Sturniolo et al. ......... | 709/227 |
| 2004/0068666 | A1* | 4/2004 | Tosey ........................ | 713/201 |
| 2004/0233930 | A1* | 11/2004 | Colby, Jr. .................. | 370/464 |
| 2005/0215274 | A1* | 9/2005 | Matson et al. ............ | 455/522 |
| 2005/0273603 | A1* | 12/2005 | Girard ........................ | 713/164 |
| 2006/0018283 | A1* | 1/2006 | Lewis et al. .............. | 370/331 |
| 2006/0129861 | A1* | 6/2006 | Kee et al. .................. | 713/323 |
| 2006/0245555 | A1* | 11/2006 | Makela .................... | 379/88.12 |
| 2007/0238440 | A1* | 10/2007 | Sengupta et al. ......... | 455/343.2 |
| 2007/0271606 | A1* | 11/2007 | Amann et al. ............ | 726/15 |
| 2007/0298848 | A1* | 12/2007 | Babin ........................ | 455/574 |

OTHER PUBLICATIONS

"Enabling Notebook Users with Wide-Area Broadband Access;" QUALCOMM Incorporated, Sep. 2005, http://www.qualcomm.com/common/documents/white_papers/Embedded_CDMANotebook.pdf.

* cited by examiner

*Primary Examiner* — Rafael Pérez-Gutiérrez
*Assistant Examiner* — Allahyar Kasraian
(74) *Attorney, Agent, or Firm* — Meyertons, Hood, Kivlin, Kowert & Goetzel, P.C.; Stephen J. Curran

(57) ABSTRACT

An apparatus for keeping a VPN session alive on a portable computer system such as a laptop computer includes a processor that executes instructions that implement application software. The laptop computer system also includes a wireless module that may communicate with a wireless network such as a wireless wide area network including wireless telephone networks, for example. In addition, the wireless module may establish a virtual private network (VPN) connection with a computer network via the wireless network. The wireless module includes a processing unit that may execute instructions that cause information to be transmitted to a host portion of the virtual private network connection at one or more predetermined times.

16 Claims, 4 Drawing Sheets

METHOD AND APPARATUS FOR KEEPING A VIRTUAL PRIVATE NETWORK SESSION ACTIVE ON A PORTABLE COMPUTER SYSTEM INCLUDING WIRELESS FUNCTIONALITY

BACKGROUND OF THE INVENTION

1. Field of the Invention

This invention relates to portable computing systems and, more particularly, to platform security of portable computing systems that include wireless functionality.

2. Description of the Related Art

Since the introduction of personal computing machines, portability of the computing environment has been in demand. As the computing power and speed of the processors that drive the computing platforms has increased, so has the demand for portability. Early portable computers such as laptop computers, for example, had access to computing networks through the use of network adapters when connected locally to a network, and via dial-up and broadband modems designed for that purpose, when connected remotely. However, when used remotely, modem access traditionally requires some type of hardwire connection to an access port.

The proliferation of cellular telephones and the desire for portable computing connectivity introduced the concept of a wireless modem connection in which the cellular telephone dialing capability was exploited as a wireless dial-up modem for computers having no other network access. In this case, a phone-specific cable was used in conjunction with various types of communication links. For example, a universal serial bus (USB) link, or an EEEE 1394 (i.e., FireWire™) link, or a wireless connection such as Bluetooth or WLAN, or the like, may be used to connect the mobile telephone to the computer.

However, connecting to the network using this type of conventional connection is sometimes limited by incompatibilities and redundancies between software and hardware combinations that may render the computing platform difficult to use when attempting synchronize, manage, or otherwise use the software and hardware combinations. For example, to keep track of address lists, email, database information, etc., it may be difficult if not impossible to use various applications across multiple platforms even though the industry may have settled on such defacto interchange standards as SynchML, and others.

One common means of communicating remotely with a network is through a protocol called Virtual Private Network (VPN). This protocol, using negotiated and authenticated encryption, may give the appearance, that the remote user is inside a network (e.g., the user's desktop on the remote machine may appear identical to his desktop at the office). One particular method for providing security in a VPN environment involves the periodic exchange of a set of packets between the remotely connected computer and the network. VPN protocols, however, are typically not tolerant of current wireless technology and may be prone to a loss of connection. For example, when the remotely connected computer moves from one cell (e.g., base station) to another or is put to sleep, the VPN protocol may not recognize the computer as the same entity.

Similarly, the VPN protocol may be lost whenever the connection is lost or interrupted, or has been quiescent for some predetermined amount of time. In addition, use of a VPN system frequently involves the inconvenience of multiple logon screens (sometimes involving a device that employs a continually changing random number) and/or multiple passwords. This may present unacceptable levels of difficulty and consumption of time.

SUMMARY

Various embodiments of a method and apparatus for keeping a VPN session alive on a portable computer system such as a laptop computer are disclosed. In one embodiment, the laptop computer system includes a processor that executes instructions that implement application software. The laptop computer system also includes a wireless module that may communicate with a wireless network such as a wireless wide area network including wireless telephone networks, for example In addition, the wireless module may establish a virtual private network (VPN) connection with a computer network via the wireless network. The wireless module includes a processing unit that may execute instructions that cause information to be transmitted to a host portion of the virtual private network connection at one or more predetermined times.

In one specific implementation, the processing unit may further execute instructions associated with a client portion of the VPN connection.

In another implementation, the processing unit may also detect inactivity between the processor and the computer network. The processing unit may further execute the instructions that cause information to be transmitted to a host portion of the VPN connection in response to detecting the inactivity.

In another embodiment, a method of establishing a virtual private network from a laptop computer system includes a processor executing instructions that implement application software and a wireless module communicating with a wireless network. The method may also include the wireless module establishing a virtual private network (VPN) connection with a computer network via the wireless network, and a processing unit of the wireless module executing instructions that cause information to be transmitted to a host portion of the virtual private network connection at one or more predetermined times.

Figure 1:
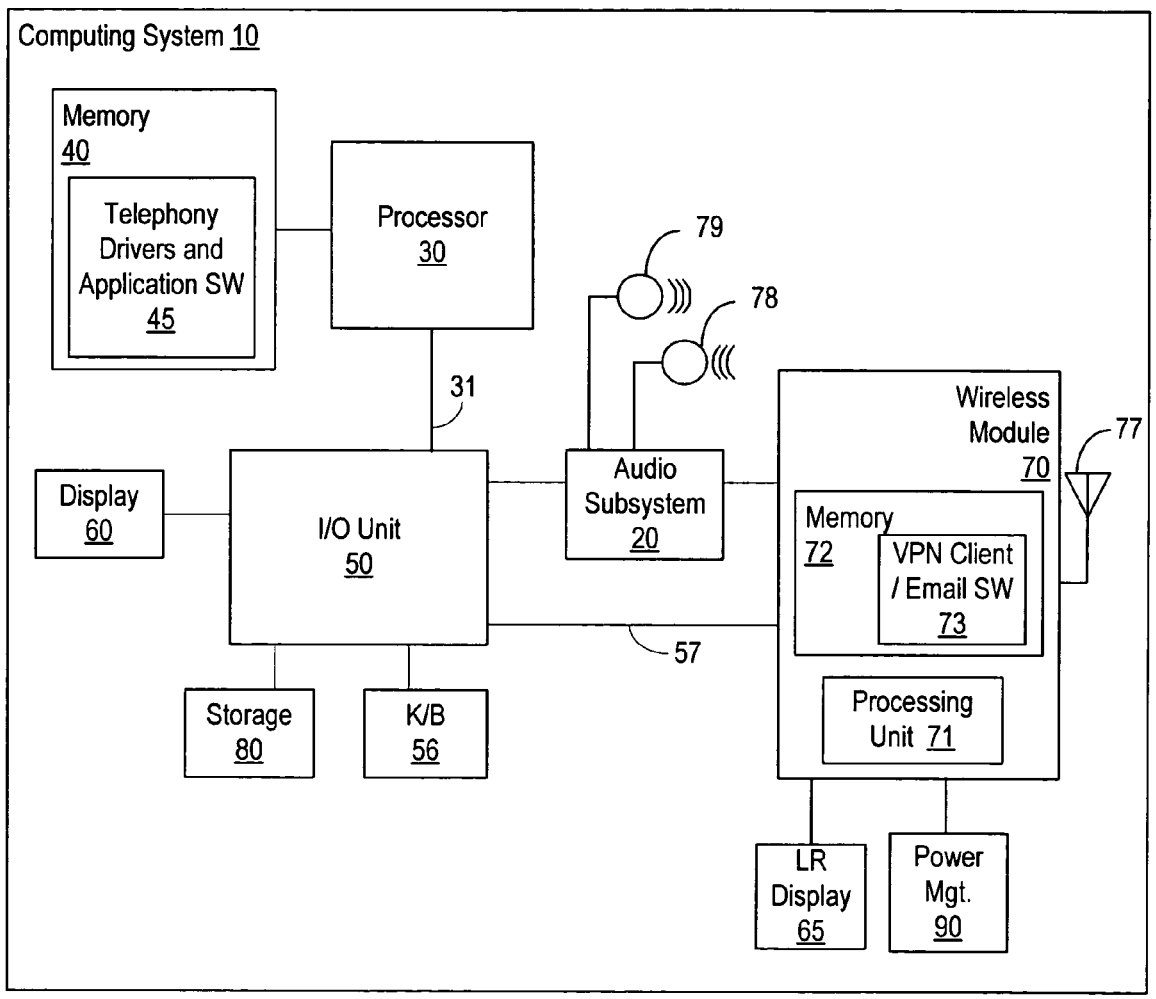
FIG. 1 is a block diagram of one embodiment of a portable computer system including wireless telephony.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a block diagram of one embodiment of a portable computer system including wireless functionality is shown. Portable computer system 10 includes a processor 30 coupled to a memory 40 and to an input/output (I/O) unit 50. I/O hub 50 is coupled to various I/O devices such as a display 60, a storage device 80, a keyboard 56, and a wireless module 70. Wireless module 70 is coupled to a low-resolution display 65, and a power management unit 90. In addition, an audio subsystem 20 is coupled between I/O unit 50 and wireless module 70.

It is noted that computer system 10 may include various other components and circuits that have been omitted for simplicity. It is further noted that the components of the computing subsystem are depicted in FIG. 1 for illustrative purposes. It is contemplated that the functionality associated with the various components may be distributed differently such that the lines between blocks may be drawn differently. Moreover, it is entirely possible that the functionality shown in FIG. 1 may be implemented on a single integrated circuit chip, such a system on a chip (SOC) implementation, as desired.

In the illustrated embodiment, processor 30 may be illustrative of a microprocessor that implements the x86 architecture. Although in other embodiments, processor 30 may be any type of processor implemented with any type of architecture. In one embodiment, processor 30 may include a memory controller (not shown) to facilitate memory transactions directed to memory 40, for example. In addition, processor 30 may include various interface circuits such as a host interface (not shown) for controlling transactions with I/O unit 50.

I/O unit 50 may be any of a variety of I/O controllers that may include bridging and graphics circuits (not shown) that may be used as interfaces between processor 30 and the various I/O devices and buses to which it is coupled. For example, in one embodiment, I/O unit 50 may be coupled to processor 30 via a HyperTransport™ link 31. In such an embodiment, I/O unit 50 may include one or more Hyper-Transport™ to peripheral component interconnect (PCI) and/or a HyperTransport™ to universal serial bus (USB) bridges for connection to PCI and USB devices, respectively, for example. In addition, in one embodiment, I/O unit 50 may be coupled to wireless module 70 via a USB, HyperTransport™ or other type of link 57, although other interconnects are contemplated. Further, I/O unit 50 may include and graphics functionality for generation of the various signals used in association with display 60 and LR display 65, for example.

It is noted that although I/O unit 50 is coupled to processor 30 via a link such as a HyperTransport™ link, for example, it is contemplated that in other embodiments, processor 30 may be coupled to the components of the system using a more traditional system architecture. For example, processor 30 may be coupled to a bus bridge (not shown) such as a Northbridge via shared bus arrangement (e.g., front side bus. (FSB)). In addition, a separate bus bridge such as a Southbridge (not shown) may be coupled to the Northbridge for coupling to various other peripheral devices (e.g., storage 80, KB 56, etc.). In such embodiments, wireless module 70 may be coupled to the Northbridge via any type of link such as a USB link, for example.

The audio subsystem 20 may include audio functionality including analog-to-digital and digital to-analog circuits for generation of the various signals associated with microphone 79 and speaker 78, for example.

Storage 80 may be a mass storage device. For example, in one embodiment storage 80 may include one or more hard disk drives. In other embodiments, storage 80 may include other types of storage media such as a non-volatile random access memory (RAM) device (e.g., a memory stick, or flash drive), compact disk (CD) drive, digital video disk (DVD) drive, tape drive, floppy drive, and the like.

In one embodiment, display 60 may be a liquid crystal display (LCD) or other type of displays such as may be common to portable laptop and notebook computers. In contrast, LR display 65 may be a display such as the type of display used on a mobile telephone or a personal digital assistant (PDA) for example. In one embodiment, LR display 65 may have a lower resolution than display 60. As will be described in greater detail below, in some modes of operation of portable computer system 10, LR display 65 may be used exclusively, while in other modes, display 60 may be used exclusively, and in still other modes, both displays may used concurrently.

As shown, wireless module 70 is coupled to an antenna 77, although in other embodiments, multiple antennas may be used. Wireless module 70 includes a processing unit 71 and a memory 72. Wireless module 70 may include the functionality of a wireless communication device such as a mobile telephone, for example. As such, in one embodiment, processing unit 71 may execute instructions and perform functions, and may include analog, digital, radio frequency (RF) and baseband circuits (not shown) that may function to perform such tasks as RF signal reception and transmission, up-conversion and down-conversion of the RF signals, analog-to-digital conversion, digital-to-analog conversion, digital signal processing of the baseband signals, as well as monitoring and control functions. Accordingly, in various implementations, processing unit 71 may include hardware that includes a separate processor such as an advanced RISC machine (ARM) processor, for example, a digital signal processing unit, and/or one or more hardware accelerators for handling complex algorithms such as encryption and decryption. It is noted that memory 72 may be any type of memory including volatile memory such as RAM, or non-volatile memory such as Flash memory or read only memory (ROM), among others, for example.

In one embodiment, the instructions executed by processing unit 71 may include instructions that implement VPN client software. As such, wireless module 70 may be configured to autonomously initiate and maintain a VPN connection through the Internet via a wireless network such as a wireless wide area network that may include a wireless telephone network, for example. As described in greater detail below, wireless module 70 may also be configured to maintain the VPN connection (i.e., VPN keep-alive) irrespective of whether processor 30, and/or the remainder of the computing subsystem are in a low-power mode such as a sleep mode, for example. Accordingly, it is noted that, once configured wireless module 70 may initiate and maintain the VPN connection without any special action by software executing on processor 30, the VPN connection becomes transparent to the user, much like a completely private intranet connection with virtually no software and/or encryption overhead by processor 30.

As mentioned above, wireless module 70 may communicate with a wireless network, such as a wireless telephone network, for example. The wireless network may conform to any of a variety of communication standards that may be compatible with various technologies such as the second (2G), third (3G) and fourth (4G) generation mobile phone technologies. In addition, the wireless network may be a wireless wide area network implemented to be compatible with such protocols as WiMax, WiBro, NextNet, and others. More particularly, in various embodiments, wireless module 70 may employ a time-division multiple access (TDMA), a code division multiple access (CDMA) and/or a wireless CDMA (WCDMA) technique to implement standards such as the Global System for Mobile Communications (GSM) standard, the Personal Communications Service (PCS) standard, and the Digital Cellular System (DCS). standard, for example. In addition, many data transfer standards that work cooperatively with the various technology platforms may also be supported. For example, wireless module 70 may also implement the General Packet Radio Service (GPRS) standard, the Enhanced Data for GSM Evolution (EDGE) standard, which may include Enhanced General Packet Radio Service standard (E-GPRS) and Enhanced Circuit Switched Data (ESCD), and the high speed circuit switched data (HSCSD) standard, high speed downlink packet access (HSDPA), high speed uplink packet access (HSUPA), evolution data optimized (EV-DO), among others.

In one embodiment, memory 40 may be a system memory that is used to store instructions and data that may be used by processor 30 as well as other devices (e.g., I/O unit 50). In various embodiments, memory 40 may be implemented using any of a variety of volatile or non-volatile memory devices. For example, memory 40 may be implemented using any number of memory devices in the dynamic RAM family of devices. In one embodiment, memory 40 may be implemented using removable or non-removable memory modules with the memory devices affixed thereto. However, other memory device configurations are possible and contemplated.

As shown, memory 40 includes telephony drivers and application software 45 stored therein. It is noted that telephony drivers and application software 45 may be stored more permanently within storage 80 and during run time, at least portions of the instructions and data being executed by processor 30 may be loaded into memory 40.

Portable computer system 10 may be described in terms of including a computing subsystem and a wireless subsystem. In one embodiment, the computing subsystem may include the components that typically make up a computing platform. For example, the computing subsystem may include processor 30, memory 40, I/O unit 50, display 60 and so on. The wireless subsystem may include wireless module 70, which includes processing unit 71, memory 72, and LR display 65. As will be described in greater detail below, in one embodiment, portable computer system 10 may operate in various modes.

During operation of portable computer system 10, either subsystem may be used alone, or both subsystems may be used together in various combinations. For example, in one mode, portable computer system 10 may operate such that only the wireless module 70 may be in operation while the computing subsystem components may be in a standby or low power state. As such, portable computer system 10 may be operated as a wireless communication device such as a mobile telephone or a personal digital assistant (PDA). In such an embodiment, LR display 65 may be used. In another mode, the wireless subsystem may be turned off or placed in a standby mode and portable computer system 10 may operate simply as a laptop or notebook computer. In still other modes, portable computer system 10 may operate using various combinations of computing and wireless communication functionality. It is noted that while portable computer system 10 is operated in the different modes, one or more components may be powered down or placed in a standby mode or other low power states. As such, portable computer system 10 includes a power management unit 90 that may manage the different modes and power states and any switching therebetween.

Depending upon the application software and drivers that may be installed, portable computer system 10 may function as a laptop computer with a fully integrated wireless communication platform that includes voice and data transfer functionality. In addition, due to the integration of the wireless hardware and the telephony drivers and application software 45 on the portable computing platform, the management of various email, address books, and other files may be seamless to a user. For example, the telephony drivers and application software 45 may include instructions that may be used to configure the wireless module 70. In one implementation, a user may select a driver via the operating system or other mechanism, for example. The driver may configure one or more operational characteristics and/or behaviors of wireless module 70. In addition, the telephony drivers and application software 45 may be used to manage email, address books, phone lists, databases, calendars, and other information traditionally used on a mobile telephone. The application software may also include applications that may be run by processor 30 such as spreadsheet, word processing, games, and the like. Once the user configures the system operation, such operations as managing general IP data traffic, receiving incoming calls, sending outgoing calls, receiving and sending email, and display management may be fully automated from a platform user perspective.

Figure 2:
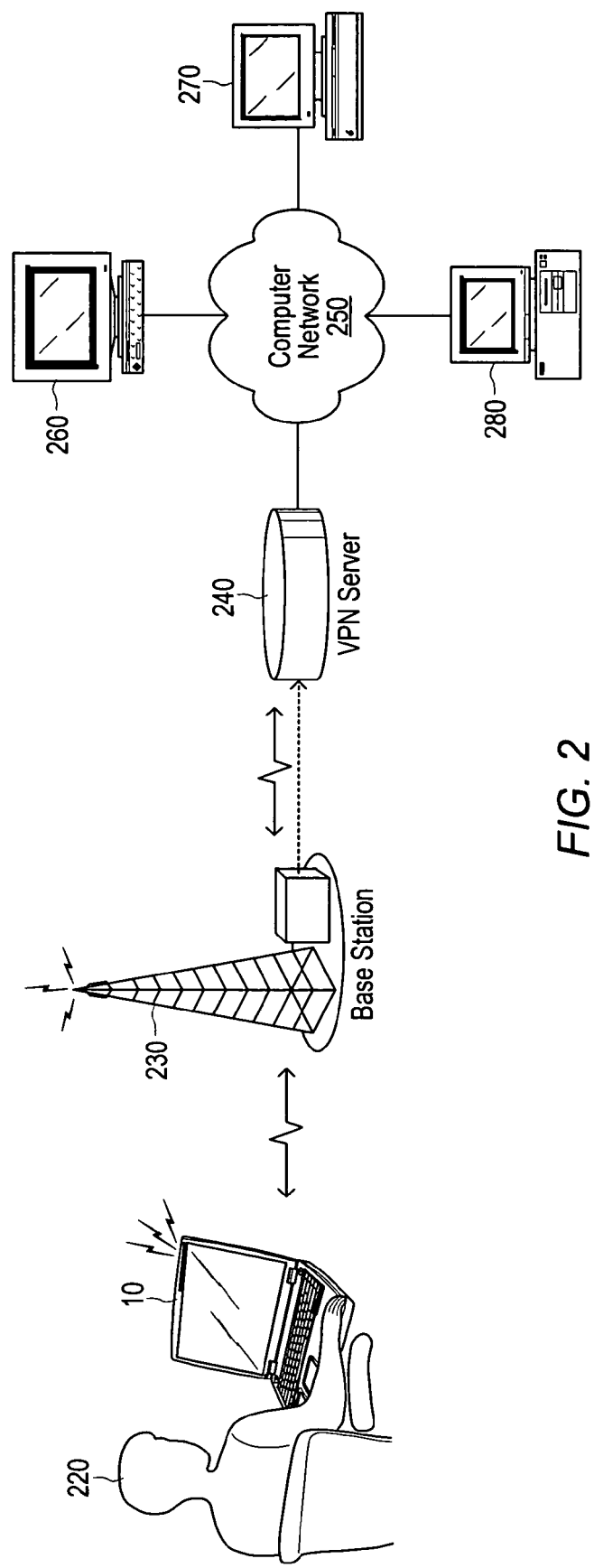
FIG. 2 is a diagram depicting the embodiment of the portable computer system shown in FIG. 1 being used in a virtual private network.

As mentioned above, portable computer system 10 may be used to connect remotely through the Internet to a computer network using a VPN connection. More particularly, as shown in FIG. 2, a user may establish and maintain connection to a computer network while working at a remote location, or while traveling in a vehicle as long as a wireless connection can be established. In one embodiment, a user may configure wireless module 70 for VPN use via one or more drivers executing on processor 30 or via configuration software executing on processing unit 71. In either case, authentication information such as authentication keys, for example, may be stored within portable computer system 10 (e.g., within memory 72, storage 80, and/or memory 40). As such, once a wireless connection is established, VPN client software may be executed by processing unit 71 to establish a VPN connection to a predetermined computer network. In addition, since the authentication keys may be stored, an authorized user such as a user with administrator privileges, may access portable computer system 10 remotely. The user may send one or packets that include commands and authentication key information to portable computer system 10 and once authorized, the commands may force a wake up of portable computer system 10 thereby enabling remote maintenance, installation and or wiping of applications and data from storage 80, and the like.

In addition, once the VPN connection is established, processing unit 71 may continue to execute the VPN client software, even during periods when processor 30 and other components of portable computer system 10 are no longer being used, and have gone into a low-power operational state. More particularly, in many VPN systems, a VPN host or gateway server may monitor the VPN connection for inactivity. If the VPN host detects inactivity for a predetermined amount of time, the VPN host may terminate the VPN connection. Similarly, some VPN client applications may also monitor the VPN connection for inactivity, and may likewise terminate the VPN connection due too inactivity for a predetermined amount of time. Accordingly, processing unit 71 may be configured to execute instructions that cause wireless module 70 to transmit information to the VPN host at predetermined times to maintain the VPN connection, which may also be referred to as keeping the connection alive. In another embodiment, processing unit 71 may also be configured to cause wireless module 70 to transmit information to a preselected IP address to prevent the VPN client from terminating the VPN connection. It is noted that the information transmitted during "keep alive frames" may be any type of information including null packets, or other no-op instructions that do not perform any essential functions.

Accordingly, transmitting keep alive information at predetermined times may keep the VPN connection active for long periods of time without user interaction. It may also allow an email client executing in the processing unit 71 to access an email server via the VPN connection. The email client may, depending upon user preferences, simply display a notification such as the subject line of any new emails on LR display 65, for example, even when the host computer is in a sleep or other low-power state. As such, the user can see that new email is waiting, wake the computer, and initiate an email update, as desired. In addition, the email client may wake the computer, and initiate the email update by downloading and storing the email. In one embodiment, these tasks may also be performed without user interaction (i.e., autonomously) dependent upon user preferences selected during the configuration process, for example.

Referring to FIG. 2, a diagram depicting an embodiment of the portable computer system shown in FIG. 1 being used in a virtual private network is shown. A user 220 is operating portable computer system 10. As shown, portable computer system 10 is a laptop or notebook computer. As described above, portable computer system 10 may initiate a wireless connection to a wireless network such as a wireless wide area network via an IP protocol, or connect to one or more base stations 230 of a wireless telephone network, via the air interface. The base station 230 may provide a connection to an Internet Service Provider (ISP) either by a wireless connection or a wire line connection. The ISP may in turn provide access to the Internet which may allow connection to VPN server 240. VPN server 240 is coupled to computer network 250, which includes computers 260, 270, and 280 coupled together via a local area network, for example.

It is noted that VPN server 240 may perform the functionality of the VPN host or gateway described above. As such, VPN server 240 may execute VPN host software. VPN server 240 may be configured to encrypt and decrypt the information that is sent and received, respectively, via the VPN connection. Likewise, the VPN client software executed on processing unit 71 of FIG. 1 may encrypt and decrypt the information that is sent and received, respectively, by wireless module 70. Accordingly, processing unit 71 may include hardware encryption/decryption accelerators and/or may execute software that implements encoder/decoders to facilitate VPN functionality.

Figure 3:
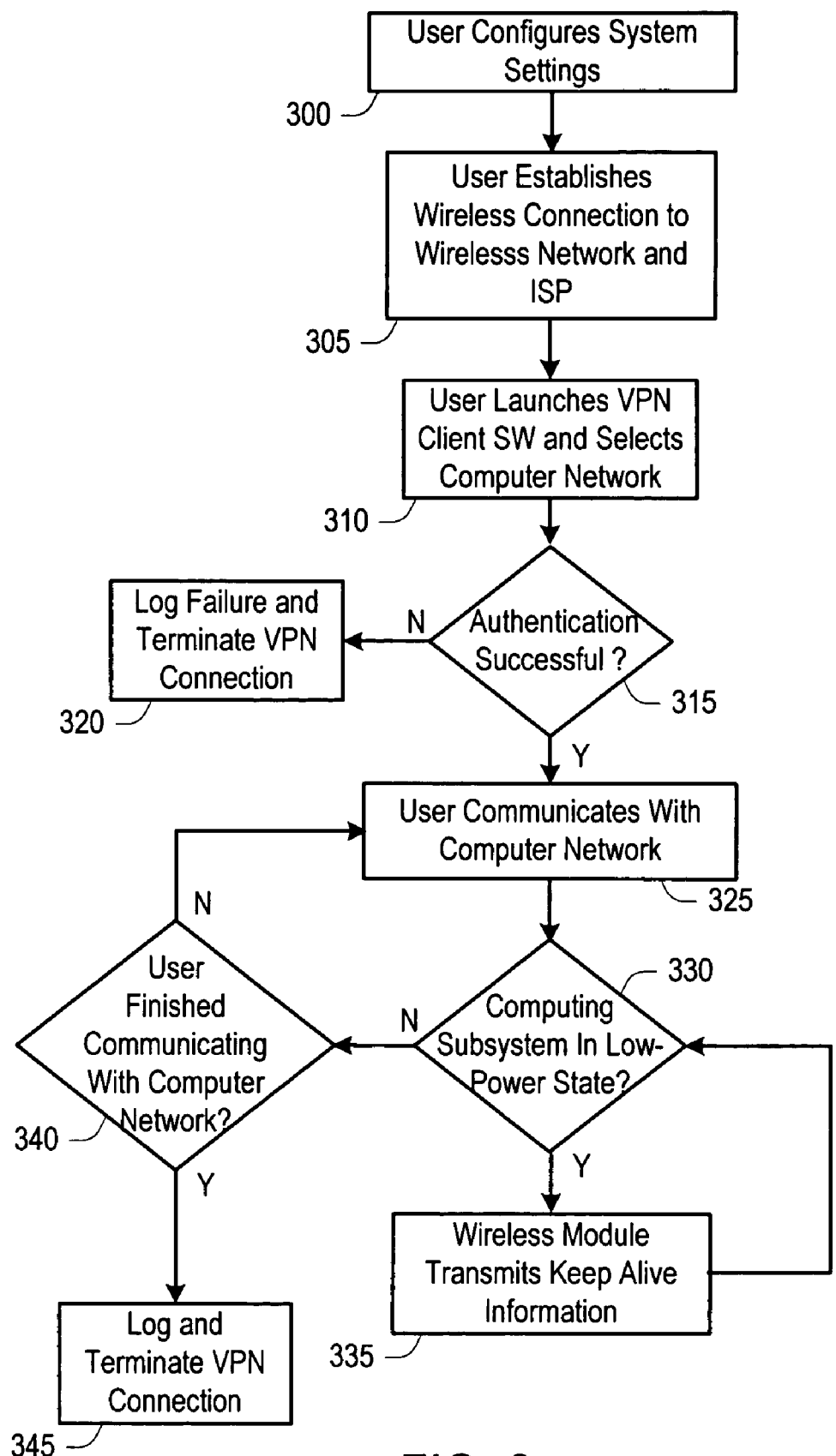
FIG. 3 is a flow diagram describing the operation of one embodiment of the portable computer system of FIG. 1.

FIG. 3 is a flow diagram describing the operation of the embodiment of the portable computer system shown in FIG. 1. Referring collectively to FIG. 1 through FIG. 3, beginning in block 300, a user may configure operation of the wireless module 70 by selecting one or more drivers. For example, passwords, encryption keys, and other authentication information may be entered and stored, low-power state operation may be selected, remote access (e.g., IP address) information may be entered, and so on.

Once the system settings have been configured, the user may establish a wireless connection to the Internet using an IP protocol, or by via dial-up by calling a telephone number to an ISP, for example (block 305). The user may launch the VPN client software 73 and select a computer network such as computer network 250 of FIG. 2, for example, to which the user desires to connect (block 310).

The VPN client software may initiate a connection request sequence with a VPN host such as VPN server 240 of FIG. 2, for example. VPN server 240 may attempt to authenticate the user via an authentication protocol using authentication information provided by the VPN client software 73. If the authentication is not successful (block 315), the VPN server 240 and the VPN client software 73 may log the failed attempt and VPN server 240 may refuse and terminate the connection (block 320).

However, if the authentication is successful (block 315), the VPN server 240 may process the connection request and establish a VPN connection to the computer network 250. The user may then communicate with the computer network as desired in accordance with any network protocols that may be in place (block 325). In one embodiment, during operation, processing unit 71 may execute instructions that may monitor the operational state and/or the activity of the computing subsystem. More particularly, processing unit 71 may monitor communication activity between the computing subsystem and the computer network (block 330). If processing unit 71 detects that the computing subsystem has entered a low-power state, or if processing unit 71 detects inactivity between the computing subsystem and the computer network, processing unit 71 may transmit predetermined information (e.g., keep alive information) to the computer network (block 335). The monitoring and sending of keep-alive information may continue as long as there is a general lack of activity or the computing subsystem is in a low-power state.

Referring back to block 330, if processing unit 71 detects the computing subsystem has exited or is no longer in the low-power state, the user may be completing communication with the computer network (block 340). For example, the user may have placed portable computing system in a low-power state, such as the sleep mode while the VPN connection is still active. At some time later, the user may want to continue using the VPN connection, disconnect or shut down the system entirely. Accordingly, the user may wake up the system to do so. If the user is not finished, operation proceeds as described above in the description of block 325. However, if the user is finished (block 340), the user may choose to terminate the VPN connection. As such, the VPN client software 73 may log the session in a log file and terminate the session (block 345). It is noted that in some embodiments, there may be no logging of the session, just termination.

Figure 4A:
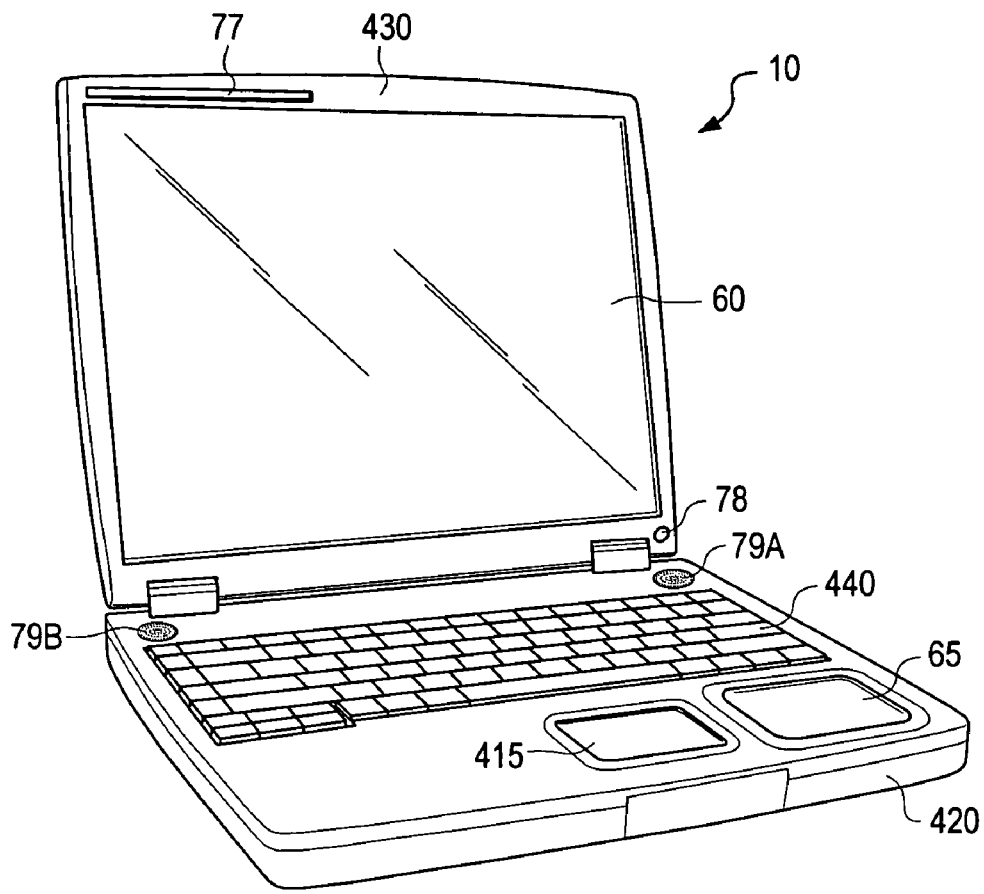
FIG. 4A is a perspective view drawing of one embodiment of the portable computer system of FIG. 1.
Figure 4B:
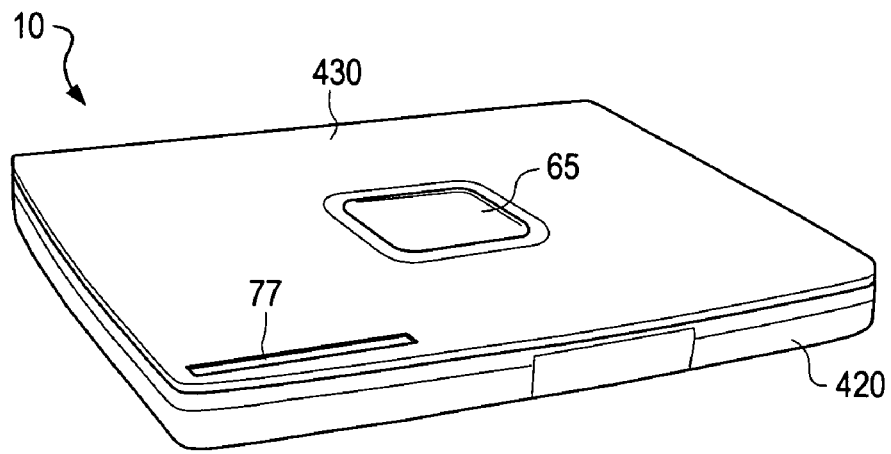
FIG. 4B is a perspective view drawing of another embodiment of the portable computer system of FIG. 1.

FIG. 4A and FIG. 4B are perspective view drawings of exemplary embodiments of the portable computer system including wireless functionality shown in FIG. 1. FIG. 4A depicts the portable computer system 10 as a laptop computer (i.e., a notebook computer) that includes a housing 420 with a hingably attached cover 430 that is in an open position. FIG. 4B depicts another embodiment of the portable computer system 10 with cover 430 in a closed position.

Referring to FIG. 4A, the cover 430 includes a display 60 such as an LCD, microelectro-mechanical (MEMS), or electronic ink (Eink), for example, that forms a part of the internal surface of the cover. In addition, in the illustrated embodiment, portable computer system 10 includes an antenna 77 that is mounted to cover 430. It is noted that the mounting location, type, and numbers of antenna 77 are implementation details. Accordingly, although antenna 77 is shown mounted to the inside of cover 230, in other embodiments, antenna 77 may be mounted to cover 230 or housing 220, or even internal to housing 220 as desired. In addition, antenna 77 may go entirely or partially around display 60.

Portable computer system 10 also includes a microphone 78, speakers 79A and 79B, and a keyboard 440, and a touch activated mouse control 415 that are mounted on a top surface of the housing 420. In addition, portable computer system 10 includes an additional display unit (e.g., LR display 65) mounted to the top surface of housing 420. As described above, in one embodiment, display 65 may be a low-resolution display. In various other embodiments, LR display 65 may also be an input device (e.g., touch-activated screen) to facilitate use of a pointing device such as a stylus, for example. As such, LR display 65 may include analog-to-digital conversion circuits to input data from the screen. It is noted that the location and type of LR display 65 are also implementation details. As such, LR display 65 may be located in any desired location, another example of which is shown in FIG. 4B.

Referring to FIG. 4B, the embodiment of portable computer system 10 shown in FIG. 4B is similar to the embodiment shown in FIG. 4A. However, the embodiment of portable computer system 10 shown in FIG. 4B does not include LR display 65 mounted on the top surface of housing 420. Instead, as illustrated in FIG. 4B, LR display 65 is mounted on the external surface of cover 430 such that LR display 65 is visible and useable when cover 430 is in the closed position. In addition, as noted above, in the illustrated embodiment, antenna 77 is mounted on the external surface of cover 430, but may be mounted internal to housing 420, or any other location, as desired.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A laptop computer system comprising:
   a first processor configured to execute instructions that implement application software; and
   a wireless module coupled to the first processor via an input/output unit and configured to communicate with a wireless network;
   wherein the wireless module includes a processing unit including a digital signal processing unit and a second processor that is separate from the digital signal processing unit and the first processor;
   wherein the processing unit is configured to autonomously establish and maintain a virtual private network (VPN) connection with a computer network via the wireless network without intervention by the first processor; and
   wherein the processing unit is configured to execute instructions that cause information to be transmitted to a host portion of the virtual private network connection at one or more predetermined times; and
   wherein the processing unit is further configured to cause the first processor to exit a low-power state in response to receiving packets including particular commands via the VPN connection from an authenticated user.

2. The laptop computer system as recited in claim 1, wherein the processing unit is further configured to execute instructions associated with a client portion of the VPN connection.

3. The laptop computer system as recited in claim 1, wherein the processing unit is further configured to detect inactivity between the first processor and the computer network.

4. The laptop computer system as recited in claim 3, wherein the processing unit is further configured to execute the instructions that cause information to be transmitted to a host portion of the VPN connection in response to detecting the inactivity.

5. The laptop computer system as recited in claim 3, wherein the processing unit is further configured to detect when the first processor is in the low-power state.

6. The laptop computer system as recited in claim 3, wherein the processing unit is further configured to execute the instructions that cause information to be transmitted to a host portion of the VPN connection in response to detecting the first processor being in the low-power state.

7. The laptop computer system as recited in claim 1, wherein the processing unit is further configured to execute instructions that implement an email client, and wherein the email client is configured to in a first mode, display notification of a pending received email on a low-resolution display during time periods in which the processor is in a low-power state, and the email client is configured to in a second mode, download and store the pending received email during time periods in which the first processor is in the low-power state.

8. A method of establishing a virtual private network from a laptop computer system, the method comprising:
   a first processor executing instructions that implement application software;
   a wireless module communicating with a wireless network;
   a second processor within a processing unit of the wireless module autonomously establishing and maintaining a virtual private network (VPN) connection with a computer network via the wireless network without intervention by the first processor; and
   the second processor executing instructions that cause information to be transmitted to a host portion of the virtual private network connection at one or more predetermined times; and
   the processing unit causing the first processor to exit a low-power state in response to receiving packets including particular commands via the VPN connection from an authenticated user.

9. The method as recited in claim 8, further comprising the second processor executing instructions associated with a client portion of the VPN connection.

10. The method as recited in claim 8, further comprising the processing unit detecting inactivity between the processor and the computer network.

11. The method as recited in claim 10, further comprising the second processor executing the instructions that cause information to be transmitted to a host portion of the VPN connection in response to detecting the inactivity.

12. The method as recited in claim 10, further comprising the processing unit detecting when the first processor is in a low-power state.

13. The method as recited in claim 10, further comprising the second processor executing the instructions that cause information to be transmitted to a host portion of the VPN connection in response to detecting the first processor being in the low-power state.

14. The method as recited in claim 8, further comprising the wireless module performing functions associated with digital signal processing of audio signals.

15. The method as recited in claim 8, further comprising the wireless module establishing the VPN connection by establishing a wireless connection with an Internet services provider (ISP).

16. The method as recited in claim 8, further comprising the processing unit executing instructions that implement an email client, in a first mode, the email client displaying notification of a pending received email on a low-resolution display during time periods in which the processor is in a low-power state, and in a second mode, the email client downloading and storing the pending received email during time periods in which the first processor is in a low-power state.

* * * * *